United States Patent
Lim et al.

(10) Patent No.: US 7,468,592 B2
(45) Date of Patent: Dec. 23, 2008

(54) APPARATUS FOR MOVING CENTER OF GRAVITY OF ROBOT, AND SYSTEM AND METHOD USING THE SAME

(75) Inventors: Eul Gyoon Lim, Daejeon (KR); Seung Min Choi, Daejeon (KR); Dae Hwan Hwang, Daejeon (KR)

(73) Assignee: Electronics and Telecommunications Research Insitute, Daejeon (KR)

( * ) Notice: Subject to any disclaimer, the term of this patent is extended or adjusted under 35 U.S.C. 154(b) by 182 days.

(21) Appl. No.: 11/633,179

(22) Filed: Dec. 4, 2006

(65) Prior Publication Data

US 2007/0132420 A1    Jun. 14, 2007

(30) Foreign Application Priority Data

Dec. 8, 2005  (KR) ................ 10-2005-0119829
Jun. 21, 2006  (KR) ................ 10-2006-0055956

(51) Int. Cl.
*B25J 5/00*    (2006.01)

(52) U.S. Cl. .................. 318/568.12; 318/568.11; 318/587; 280/758; 180/8.2; 180/907

(58) Field of Classification Search ............ 318/587, 318/568.11, 568.12; 180/21, 9.38; 73/862.03; 901/1
See application file for complete search history.

(56) References Cited

U.S. PATENT DOCUMENTS

| | | | | |
|---|---|---|---|---|
| 4,573,548 A | * | 3/1986 | Holland | 180/211 |
| 4,615,223 A | * | 10/1986 | Nause | 73/862.03 |
| 4,657,104 A | * | 4/1987 | Holland | 180/211 |
| 4,679,803 A | * | 7/1987 | Biller et al. | 180/9.23 |
| 5,615,748 A | * | 4/1997 | Lansberry | 180/9.36 |
| 5,732,962 A | * | 3/1998 | Mageren et al. | 280/124.103 |
| 5,901,805 A | * | 5/1999 | Murakami et al. | 180/168 |
| 6,019,056 A | * | 2/2000 | Maeda et al. | 114/122 |
| 6,044,921 A | * | 4/2000 | Lansberry | 180/9.36 |
| RE37,098 E | * | 3/2001 | Lansberry | 180/9.36 |
| 6,220,377 B1 | * | 4/2001 | Lansberry | 180/9.36 |
| 6,408,230 B2 | * | 6/2002 | Wada | 701/1 |
| 6,408,963 B1 | * | 6/2002 | Lansberry | 180/9.34 |
| RE38,701 E | * | 2/2005 | Lansberry | 180/9.36 |
| 6,976,432 B2 | * | 12/2005 | Jacob | 105/72.2 |
| 7,152,882 B2 | * | 12/2006 | Tokumaru et al. | 280/758 |

FOREIGN PATENT DOCUMENTS

JP    2004-321705    11/2004
JP    2005-53467    3/2005

* cited by examiner

*Primary Examiner*—Paul Ip
(74) *Attorney, Agent, or Firm*—Ladas & Parry LLP (57) ABSTRACT

An apparatus for moving the center of gravity of a robot, and a system and method using the apparatus are provided. The apparatus includes a weight conveyor with a conveyed weight weighing a predetermined amount and disposed within the main body of the robot. The conveyed weight is conveyed in a predetermined direction to move the center of gravity of the robot, thus allowing a non-driven caster of the robot to surmount obstacles in its path and not become stuck while the robot is moving.

14 Claims, 7 Drawing Sheets

APPARATUS FOR MOVING CENTER OF GRAVITY OF ROBOT, AND SYSTEM AND METHOD USING THE SAME

BACKGROUND OF THE INVENTION

1. Field of the Invention

The present invention relates to a robot capable of overcoming obstacles, and more particularly, to an apparatus for moving the center of gravity in a robot to supplement the support provided by the wheels of the robot and directional changes, and a system and method using the apparatus. When wheel-type mobile robots with casters used in home or office environments face obstacles such as doorsills and power cords while moving, they are immobilized when their casters (that are not driven) become hitched on an obstacle. In this case, the present invention uses the center of gravity of the robot to overcome the obstacle.

2. Description of the Related Art

Figure 1:
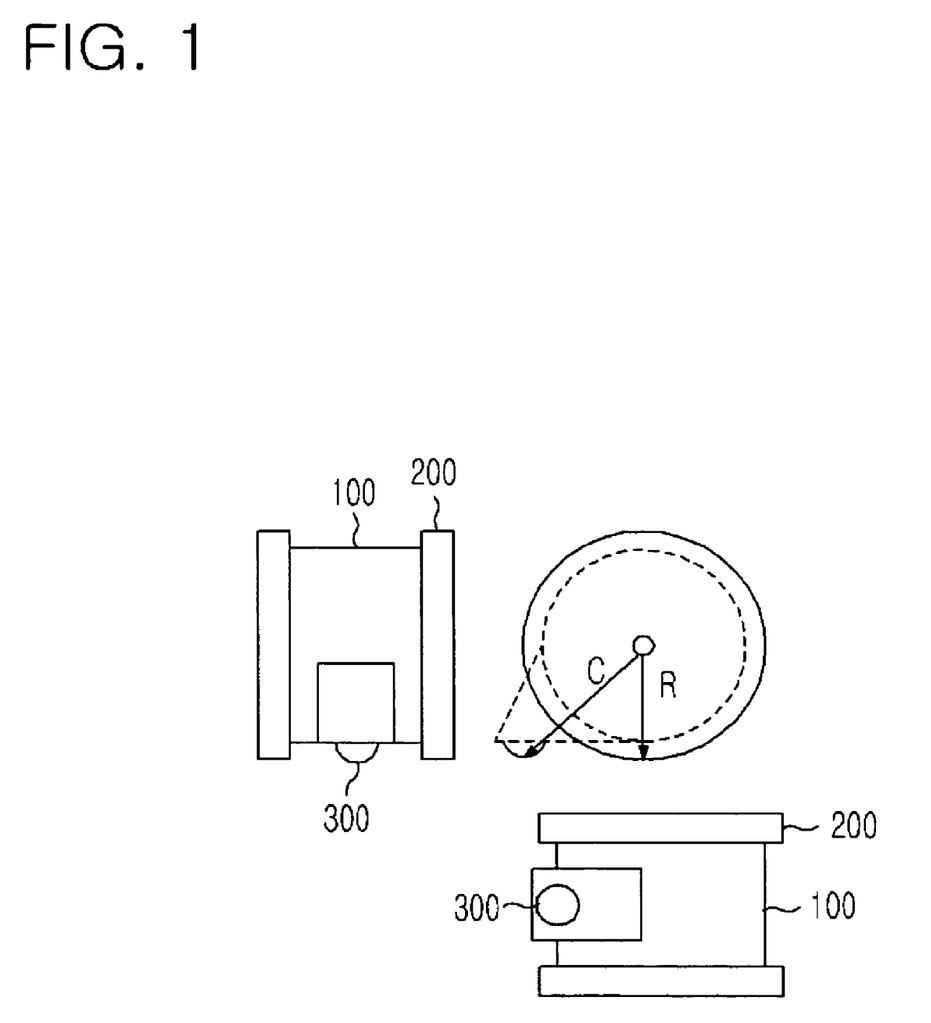
FIG. 1 illustrates a robot with two drive wheels and one caster.

Conventional mobile robots with drive systems employing differentials generally have two driven wheels and one or two non-driven casters, where components are arranged within the robot so that the center of gravity lies between the axes of the drive wheels and the casters, ensuring traction and stability. Since all objects that move on the ground using wheels have their centers of gravity above the contact patches of the wheels, when decelerating, their inertial force causes the contact patches of the front wheels to be the rotational center and the moment to be in the direction of the rear wheels lifting. When the distance between the front wheels and the trailing casters is short compared to the height of unit, as shown in FIG. 1, the moment of inertia is more liable to upset the balance of the unit. Accordingly, in the configuration shown in FIG. 1, the center of gravity is distributed to be biased above the caster by means of an added weight. However, this not only increases the overall weight of the unit, but also concentrates weight over the caster.

Generally, when a mobile robot must pass over an obstacle, the drive wheels are able to roll over the obstacle; but there are many instances in which the casters (that are not driven) are unable to surmount the obstacle and become stuck. This is explained with reference to FIGS. 2a, 2b and 2c.

Figure 2A:
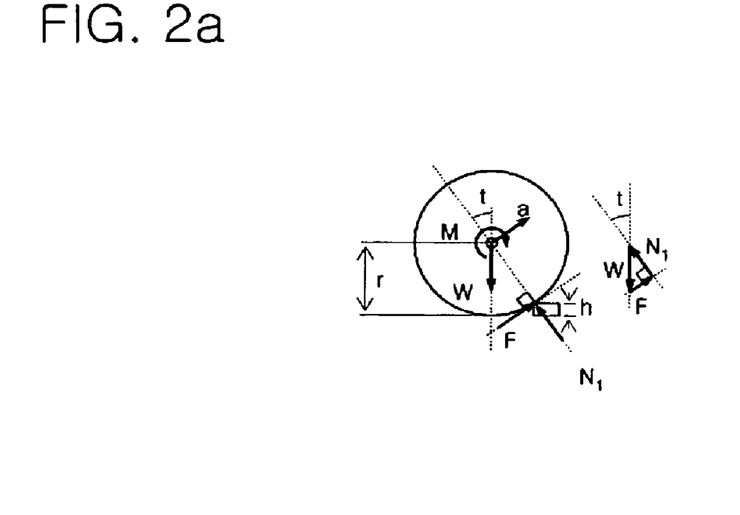
FIG. 2a illustrates the force equilibrium at the moment when a drive wheel with a radius r surmounts an obstacle.
Figure 2B:
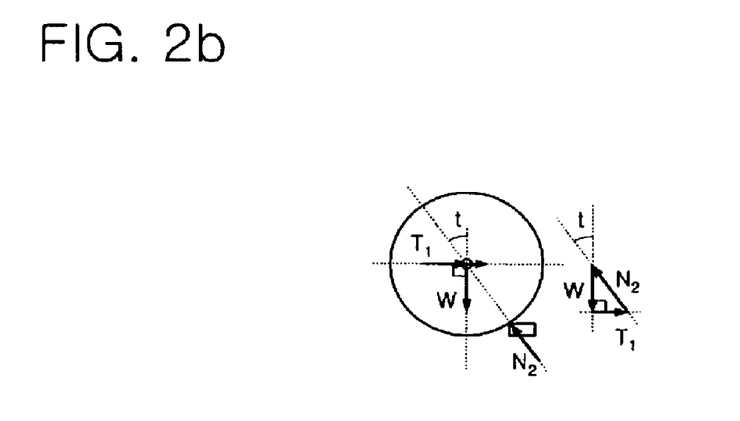
FIG. 2b illustrates the force equilibrium at the moment when a caster with a radius r surmounts an obstacle.
Figure 2C:
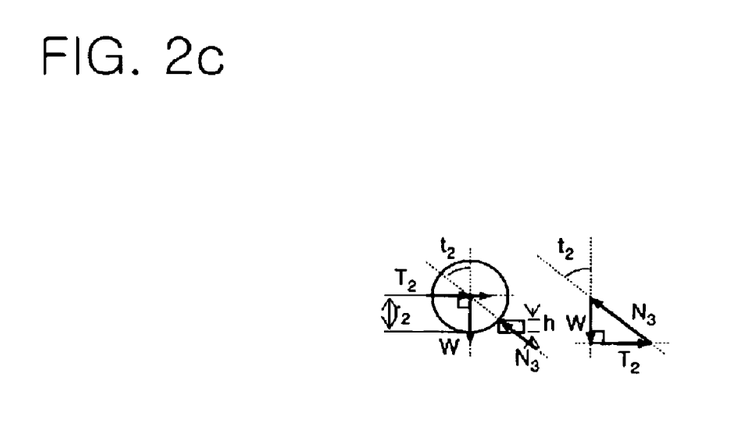
FIG. 2c illustrates the force equilibrium at the moment when a caster with a radius $r_2$ surmounts an obstacle.

FIG. 2a illustrates the force equilibrium at the moment when a drive wheel with a radius r surmounts an obstacle, FIG. 2b illustrates the force equilibrium at the moment when a caster with a radius r surmounts an obstacle, and FIG. 2c illustrates the force equilibrium at the moment when a caster with a radius $r_2$ surmounts an obstacle. A description of the propulsion needed for drive wheels and a caster to overcome an obstacle will now be given.

Referring to FIG. 2a, when the moment M is applied to the axis of the drive wheels, a frictional force F proportional to a reaction force N1 at the contact patches of the drive wheels is generated. At the moment that the drive wheels begin mounting the obstacle, the reaction force is negated, and forces (as shown in the force vector diagram to the right) remain. Here, the frictional force F is as follows.

$$F = W^* \sin(t) = W^* \sin(a \cos((r-h)/r))$$

If a greater frictional force is applied against the frictional force F, then acceleration in the direction over the obstacle will be generated to overcome the obstacle. Since the frictional force is always less than a normal force, the angle (t) in the force vector diagram lies within a range between 0° and 45°. Thus: 0°<t<45°.

After the drive wheels satisfy the above conditions and roll over the obstacle, the caster must roll over the obstacle. Assuming that the caster that receives a thrust $T_1$ has a radius r equal to that of the drive wheels, the force vector diagram in FIG. 2b applies.

$$T_1 = W^* \tan(t) = W^* \tan(a \cos((r-h)/r))$$

However, because the caster must rotate in a predetermined direction, increasing the size of the caster necessitates reducing the interior space of the robot. Thus, the actual radius $r_2$ of the caster is always smaller than the radius r of the drive wheels. FIG. 2c shows the radius value $r_2$ of the caster being smaller than the radius r of the drive wheels.

$$T_2 = W^* \tan(t_2) = W^* \tan(a \cos((r_2-h)/r_2))$$

In the range 0°<t<45°, the tan value is always greater than the sin value, and the tan value increases in accordance with an increase in angle. Therefore, relations between the sizes of F, $T_1$, and $T_2$ are as follows.

$$F < T_1 < T_2$$

Accordingly, a force greater than the rotating force of the drive wheels is needed for the caster to overcome an obstacle.

When a moment of the wheels is applied with a force in the direction against the caster, the equilibrium of the moment presses the caster against the obstacle, such that a weight W applied on the caster increases from a non-moving state and a thrust $T_2$ increases as well, so that it becomes difficult for the caster to surmount the obstacle. In this case, even with a relatively low obstacle that the robot appears to be able to overcome, due to the caster, the robot is unable to pass over the obstacle.

On the other hand, when the robot applies a moment of the drive wheels in a direction of the caster, the weight applied on the caster is alleviated. However, because the caster is made with a small radius for the sake of miniaturizing the robot's main body, nonetheless, it is difficult for the caster to overcome the obstacle without being lifted.

As a method of overcoming an obstacle by passing over it is disclosed in Japanese Patent Publication No. 2004-321705, entitled "TRANSFER APPARATUS, AND TRAVEL APPARATUS", which is hereby incorporated by reference, and is thus omitted herefrom. In this disclosure, a linked lift system is used to raise each wheel a certain distance for an elevating effect, which allows the unit to scale stairs, etc. However, this unit cannot easily surmount obstacle on a flat floor surface.

Another apparatus is disclosed in Japanese Patent Publication No. 2005-0053467, entitled "MOBILE ROBOT", which is hereby incorporated by reference, and is thus omitted herefrom. Here, each wheel has a means for changing its elevation, so that should there be a discrepancy in the height of a floor surface, the wheels may be respectively elevated to maintain level contact with the floor surface. However, this method requires installing complex mechanisms on each wheel, which is unsuitable for indoor robot applications.

SUMMARY OF THE INVENTION

Accordingly, the present invention is directed to an apparatus for moving the center of gravity of a robot and a system and method using the same, which substantially obviate one or more problems due to limitations and disadvantages of the related art.

It is an object of the present invention to provide an apparatus for allowing a robot to overcome obstacles by moving a movable weight within the robot to adjust the center of gravity in the robot, and a system and method using the same.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, there is provided an apparatus for moving the center of gravity in a robot a main body, drive wheels for supporting the main body and rotating, and a caster installed at a lower portion of the main body, the caster for facilitating directional changes, the apparatus including: a weight conveyor installed within the main body, for moving a conveyed weight of a predetermined weight in a predetermined direction and moving the center of gravity of the robot.

The weight conveyor may include: a conveyor motor; a conveyor pulley connected to and rotating with the conveyor motor; and a conveyor belt connected to the conveyor pulley, for moving the conveyed weight in the predetermined direction.

In another aspect of the present invention, there is provided a system using an apparatus for moving a center of gravity of a robot including a main body, drive wheels for supporting the main body and rotating, and a caster installed at a lower portion of the main body, the caster for facilitating directional changes, the system including: a sensor for detecting an obstacle that poses a hindrance to the caster; a weight conveyor for moving a conveyed weight of a predetermined weight in a predetermined direction and moving the center of gravity of the robot, upon receipt of a detected signal from the sensor; a drive wheel brake for fixing or unfixing the main body and the drive wheels; a controller for controlling the weight conveyor and the drive wheel brake according to a signal from the sensor; and a driver for driving the drive wheels according to a command from the controller.

In a further aspect of the present invention, there is provided a method using an apparatus for moving a center of gravity of a robot, including the steps of: detecting an obstacle that poses a hindrance to a caster installed at a bottom portion of the robot while the robot is moving; fixing a main body and drive wheels of the robot when the obstacle is detected; operating a weight conveyor for moving the center of gravity of the robot and raising the caster above the obstacle; unfixing the main body and the drive wheels when the caster is raised; operating the weight conveyor for returning the center of gravity of the robot to an original position when the main body and the drive wheels are unfixed; and rotating the drive wheels and moving the robot when the center of gravity of the robot is returned to the original position.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention, are incorporated in and constitute a part of this application, illustrate embodiments of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings.

FIGS. 3a through 3d illustrate the weight distribution on the caster according to various positions of the center of gravity, and shows a method of raising the caster to pass over the obstacle.

Figure 3:
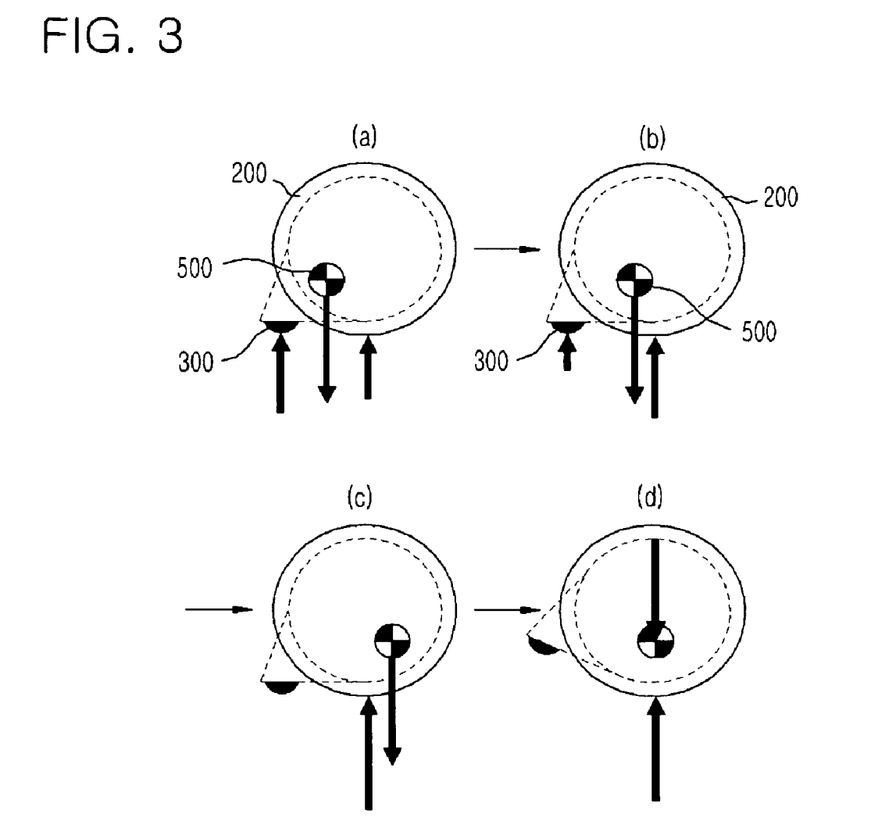
FIGS. 3a through 3d illustrate the weight distribution on the caster according to various positions of the center of gravity.

Referring to FIG. 3a, when the center of gravity of the robot lies between the axes of the caster 300 and the drive wheels 200, the robot is stable in normal deceleration. Because the load on the caster 300 is large, it is difficult for the caster 300 to surmount obstacles. Therefore, when the robot's center of gravity 500 is moved in the opposite direction of the caster in FIGS. 3b, 3c and 3d, the load on the caster 300 is increasingly reduced, or the caster 300 rises as the center of gravity 500 of the robot moves. This can be explained according to the principles of force equilibrium and moment equilibrium.

Figure 4:
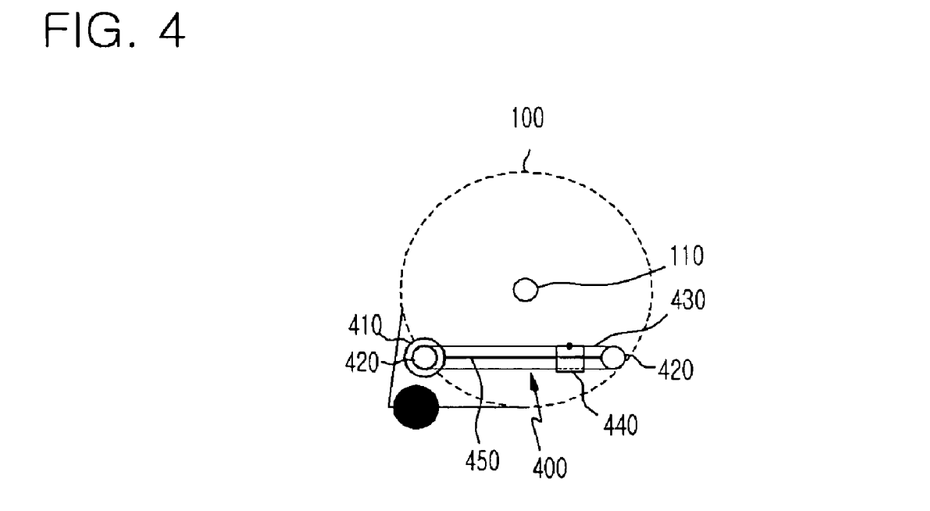
FIG. 4 is a phantom view illustrating the structure of an apparatus for moving the center of gravity in a robot according to the present invention.

FIG. 4 is a phantom view illustrating the structure of an apparatus for moving the center of gravity in a robot according to the present invention.

An apparatus for moving a robot's center of gravity includes a conveyor 400 installed within the robot to move a conveyed weight 440 in a predetermined direction to change the robot's center of gravity.

The conveyed weight 440 should be heavy enough to move the robot's center of gravity.

Although the conveyed weight 440 may be installed separately on the robot, in this case, it must be heavier so that it is able to move the robot's original center of gravity.

Therefore, the conveyed weight 440 may be a built-in component of the robot, so that it can reduce the weight at the robot's center of gravity while moving the weight to a new position in order to easily shift the robot's center of gravity.

From the robot's components, a battery may be used as the conveyed weight, for example. Additional weights may take the form of replaceable battery packs that are inserted into the robot.

The conveyor 400 conveys the conveyed weight 440 to move the robot's center of gravity.

The conveyor 400 includes a conveyor motor 410 that rotates according to a control signal, and conveyor pulleys 420 having a conveyor belt 430 wrapped therearound. One conveyor pulley 420 is connected to a rotating shaft of the motor 410 to change the motor's rotating force to a linear movement of the conveyed weight 440 on the conveyor belt 430. Also, the conveyed weight 440 is guided along a guide rail 450 along a predetermined trajectory.

The conveyor 400 may not only be provided separately from structure of the robot, but also may employ a guiding means for replacing the robot's battery pack.

The conveyor 400 and the guide rail 450 may be in the form of a standing pendulum with a driven axis.

The conveyed weight 440 may be moved to at least two different positions by the conveyor 400. One of the positions may be a position that supplies an adequate amount of weight over the caster 300 so that it does not lift under normal deceleration conditions, and the other may be a position that allows the caster 300 to be raised when a force equilibrium under static conditions exists.

Figure 5:
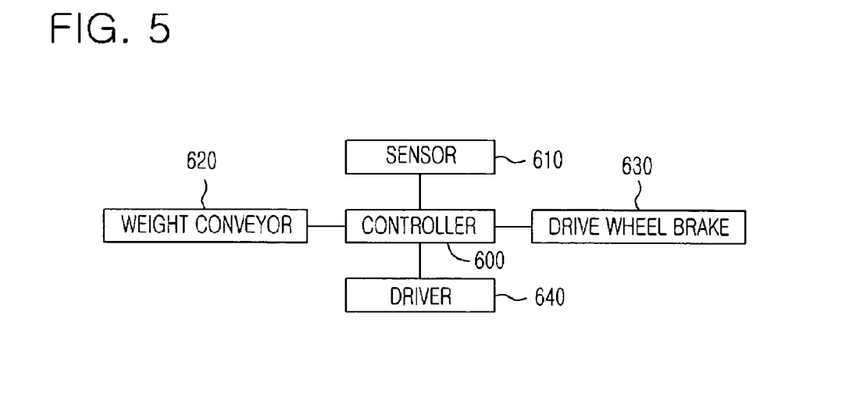
FIG. 5 is a block diagram illustrating a system using a center of gravity moving apparatus according to the present invention.

FIG. 5 is a block diagram illustrating a system using a center of gravity moving apparatus according to the present invention.

Referring to FIG. 5, a system using the apparatus for moving a center of gravity includes a main body, drive wheels that support the main body and rotate, a caster installed at the bottom of the main body to facilitate switching of directions, a sensor 610 for detecting if there is an obstacle in the way of the caster, a weight conveyor 620 that receives a detected signal from the sensor 610 and moves a predetermined conveyed weight in a predetermined direction to move the robot's center of gravity, a drive wheel brake 630 for fixing the position of the main body and drive wheels or releasing fixed drive wheels, a controller 600 that controls the weight conveyor 620 and the drive wheel brake 630 according to a signal from the sensor 610, and a driver 640 that drives the drive wheels according to a command from the controller 600.

The sensor 610 detects when an obstacle blocks the path of the caster so that it cannot move further. The sensor 610 may detect the rotating speed of the caster, use a camera to detect obstacles, or employ a variety of other detecting methods.

The weight conveyor 620 conveys the conveyed weight according to a control signal from the controller 600 when the sensor 610 sends a detected signal. After the caster is raised and passes over an obstacle, the weight conveyor 620 receives a control signal from the controller 600 and moves the conveyed weight to its original position. In this way, the robot's center of gravity is moved.

The drive wheel brake 630 receives a detected signal from the sensor 610, and brakes the main body and the drive wheels. Also, after the robot's center of gravity has been moved by means of the weight conveyor 620 to lift the caster over an obstacle, the drive wheel brake 630 is released so that the main body and drive wheels are no longer fixed.

When the drive wheel brake 630 is engaged to fix the main body and the drive wheels, the rotating angle of the drive wheels becomes 0°. Thus, when the center of gravity is shifted and the caster is raised, the drive wheels are rotated to roll a distance equal to the distance that the caster was raised.

The controller 600 receives a detected signal from the sensor 610, ends the braking signal for braking the main body and the drive wheels, and sends an operating signal to the weight conveyor 620. When the operation of the weight conveyor 620 moves the robot's center of gravity so that the caster is raised, a cancel signal is sent to the drive wheel brake 630, and a control signal is sent to the weight conveyor 620 to convey the conveyed weight to its original position.

Figure 6:
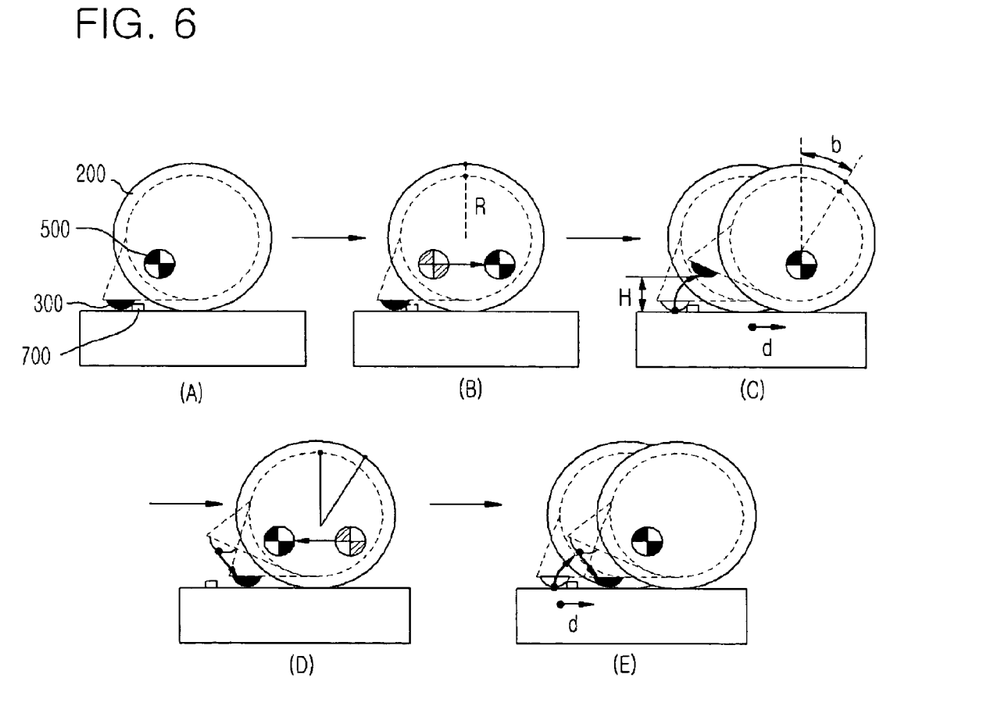
FIG. 6 illustrates a method of using a center of gravity moving apparatus according to the present invention for overcoming an obstacle.
Figure 7:
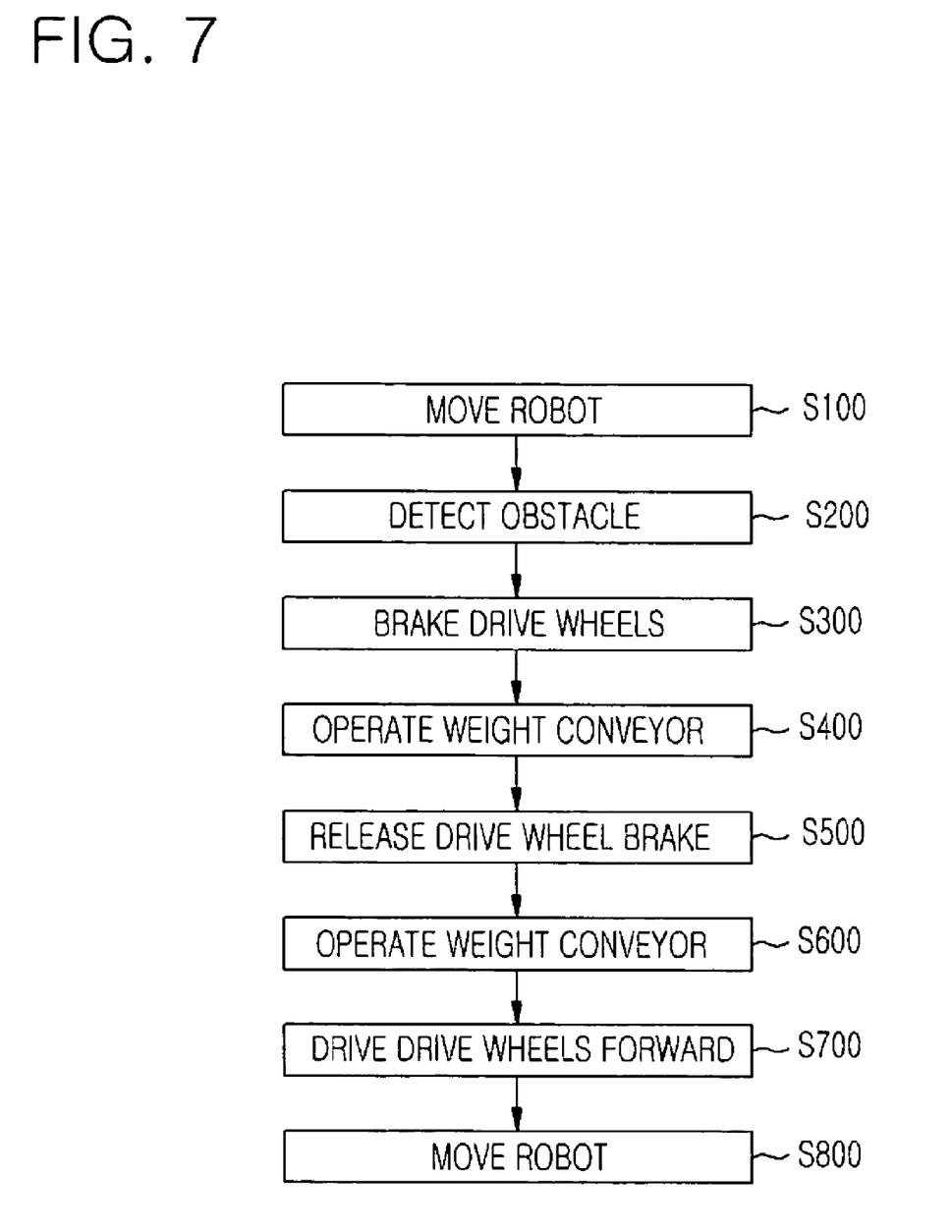
FIG. 7 is a flowchart of a method for using a center of gravity moving apparatus according to the present invention for overcoming an obstacle.

FIG. 6 illustrates a method of using a center of gravity moving apparatus according to the present invention for overcoming an obstacle, and FIG. 7 is a flowchart of a method for using a center of gravity moving apparatus according to the present invention for overcoming an obstacle. Below, a detailed description of the process of using the apparatus for moving the center of gravity to overcome an obstacle will be given, with reference to FIGS. 6 and 7.

In the process of propelling the robot, when an obstacle 700 is met, the drive wheels 200 overcome the obstacle with their driven force in step S100.

After the drive wheels 200 overcome the obstacle 700, the obstacle presents an impediment for the caster 300. Due to the obstacle, the robot reduces speed or stops completely. Here, the operation of the sensor detects the presence of the obstacle 700 in step S200.

When the obstacle 700 is detected, the braking of the drive wheels is performed in step S300, so that there is no movement of the main body or rotation of the drive wheels.

When the main body and drive wheels are fixed, the weight conveyor is operated to move the conveyed weight and thus the robot's center of gravity, to raise the caster in step S400.

Referring to FIG. 6, when the center of gravity is disposed aft of the drive wheels through the operation of the weight conveyor which conveys the conveyed weight, the moment created by gravity pivots the robot about the contact patches of the drive wheels.

Because the drive wheels do not rotate with respect to the main body, the main body of the robot moves forward by a circumferential value ($d=R*b$), where b is a rotating angle of the main body in radians and R is the radius of the drive wheels. As the main body rotates, the caster also rotates by the amount b. In this process, the caster is lifted and moves forward.

When the caster is thus lifted, there is no resistance to the moment generated by the main body of the robot on the drive wheels and no external force generated by the movement direction, so that the robot is unable to move as much as the angle of rotation. The robot may severely undulate back and forth due to the combination of the rotating inertial moment of the drive wheels and the rotating inertial moment of the main body, and the overall mass of the robot, according to kinetics.

After the caster is lifted and moves forward, the braking of the main body and the drive wheels is canceled in step S500.

After the braking of the main body and drive wheels are canceled, the weight conveyor is activated in step S600 to lower the caster.

During the operating of the weight conveyor and the returning of the conveyed weight to its original position, the caster drops as a result in the shift of the robot's center of gravity. Here, when the center of gravity is restored to its original position, the contact patches of the drive wheels remain the same and only the main body of the robot is rotated. Because the caster is lowered when the drive wheels have moved forward, the caster clears or lies atop the obstacle.

After the weight conveyor is operated, the drive wheels are operated in step S700.

Figure 8:
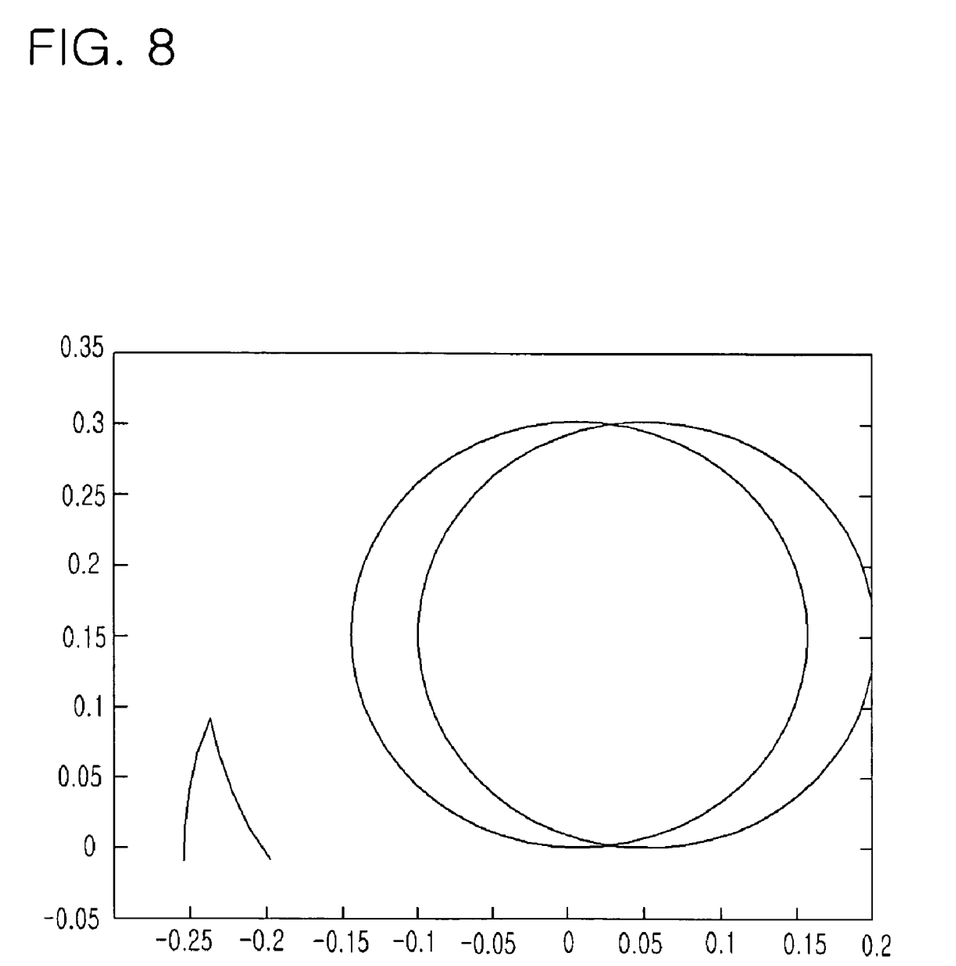
FIG. 8 is a graph illustrating a locus curve of a caster when the distance between the wheels and the caster is long.
Figure 9:
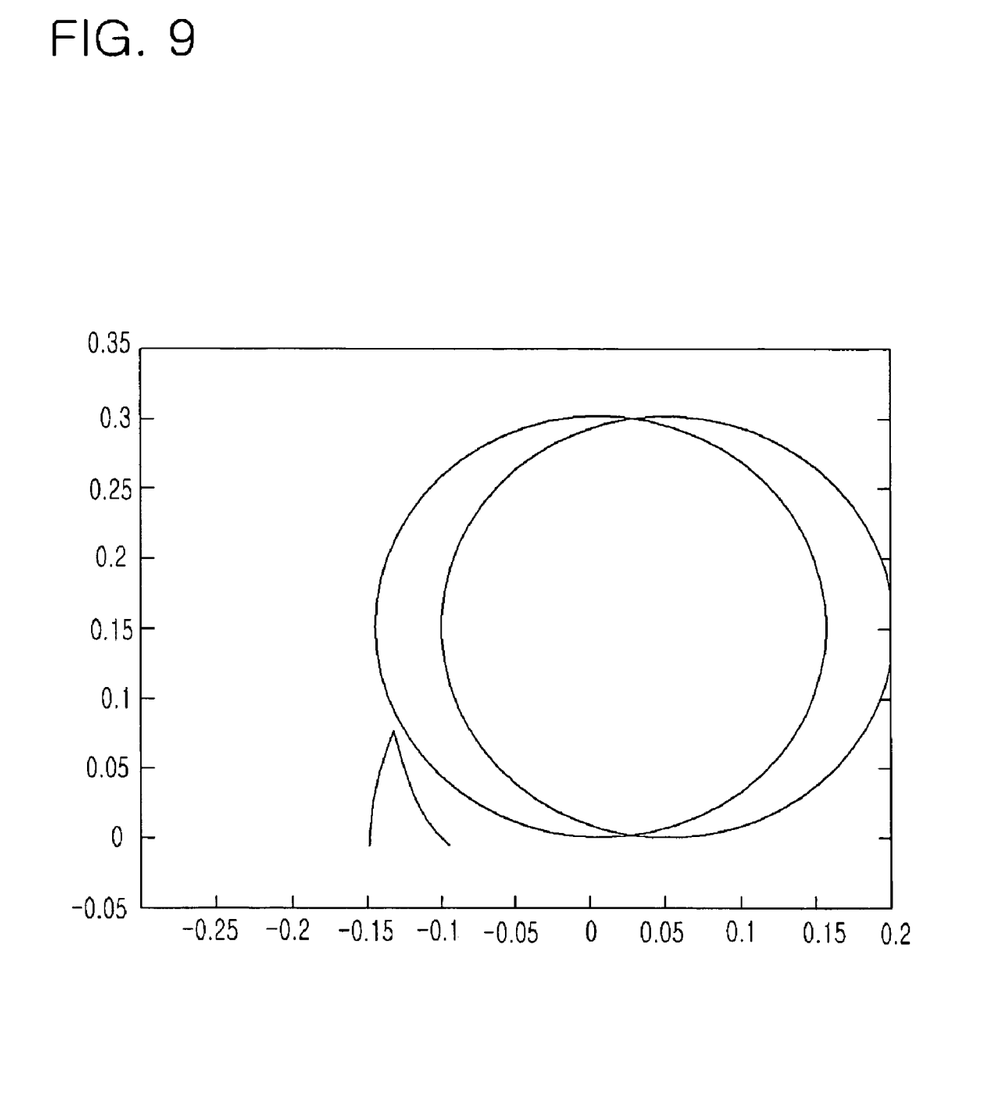
FIG. 9 is a graph illustrating a locus curve of a caster when the distance between the wheels and the caster is short.

FIGS. 8 and 9 are respectively graphs illustrating locus curves of a caster when the distances between the wheels and the casters are long and short.

C represents the distance from the axis of the drive wheels to the caster. Referring to FIG. 8, when the radius R of the drive wheels is 15 cm and C is 30 cm, the rotating angle b of the drive wheels rotated by the change in the center of gravity is 20°, the distance moved by the drive wheels is 5.24 cm, and the elevation H of the caster is 9.79 cm. On the other hand, in FIG. 9, in a case where the radius R of the drive wheels, the rotating angle b, and the distance traveled d are all the same, and only the distance C from the axis of the drive wheels to the caster is around 20 cm, the moving of the center of gravity causes the elevation (H) of the caster to be 5.43 cm. Accordingly, the elevation of the caster increases as the distance between the axis of the drive wheels and the caster increases. However, in the case of a mobile robot having a relatively short distance (of approx. 20 cm) between its drive wheel axis and caster, the caster may be raised around 5 cm by altering the center of gravity, so that the caster can be sufficiently raised to clear most obstacles found in household or office environments.

As described above, the inventive apparatus for moving the center of gravity in a robot and the system and method using the apparatus obviates the problem of a non-driven caster catching on an obstacle while the robot is moving and preventing the robot from further movement. This is achieved by using a weight conveying device built into the robot that shifts the robot's center of gravity so that the robot is able to easily and conveniently overcome obstacles and expand its range of movement.

It will be apparent to those skilled in the art that various modifications and variations can be made in the present invention. Thus, it is intended that the present invention covers the modifications and variations of this invention provided they come within the scope of the appended claims and their equivalents.

What is claimed is:

1. An apparatus for moving a center of gravity of a robot including a main body, drive wheels for supporting the main body and rotating, and a caster installed at a lower portion of the main body, the caster for facilitating directional changes, the apparatus comprising:
    a sensor for detecting an obstacle that poses a hindrance to the caster; and
    a weight conveyor installed within the main body, for moving a conveyed weight of a predetermined weight in a predetermined direction and moving the center of gravity of the robot, upon receipt of a detected signal from the sensor.

2. The apparatus of claim 1, wherein the weight conveyor comprises:
    a conveyor motor;
    a conveyor pulley connected to and rotating with the conveyor motor; and
    a conveyor belt connected to the conveyor pulley, for moving the conveyed weight in the predetermined direction.

3. The apparatus of claim 2, wherein the weight conveyor further comprises a guide rail installed thereon for guiding the conveyed weight along a predetermined trajectory.

4. The apparatus of claim 1, wherein the conveyed weight is an existing component of the robot.

5. The apparatus of claim 4, wherein the existing component is a battery built in the robot.

6. A system using an apparatus for moving a center of gravity of a robot including a main body, drive wheels for supporting the main body and rotating, and a caster installed at a lower portion of the main body, the caster for facilitating directional changes, the system comprising:
    a sensor for detecting an obstacle that poses a hindrance to the caster;
    a weight conveyor for moving a conveyed weight of a predetermined weight in a predetermined direction and moving the center of gravity of the robot, upon receipt of a detected signal from the sensor;
    a drive wheel brake for fixing or unfixing the main body and the drive wheels;
    a controller for controlling the weight conveyor and the drive wheel brake according to a signal from the sensor; and
    a driver for driving the drive wheels according to a command from the controller.

7. The system of claim 6, wherein the weight conveyor comprises:
    a conveyor motor;
    a conveyor pulley connected to and rotating with the conveyor motor; and
    a conveyor belt connected to the conveyor pulley, for moving the conveyed weight in the predetermined direction.

8. The system of claim 7 wherein the weight conveyor further comprises a guide rail installed thereon for guiding the conveyed weight along a predetermined trajectory.

9. The system of claim 6, wherein the drive wheel brake receives the detected signal from the sensor and fixes the main body and the drive wheels, and unfixes the main body and the drive wheels when the weight conveyor moves the center of gravity of the robot and the caster rises.

10. The system of claim 6, wherein the conveyed weight is an existing component of the robot.

11. The system of claim 10 wherein the existing component is a battery built in the robot.

12. A method using an apparatus for moving a center of gravity of a robot, comprising the steps of:
    detecting an obstacle that poses a hindrance to a caster installed at a bottom portion of the robot while the robot is moving;
    fixing a main body and drive wheels of the robot when the obstacle is detected;
    operating a weight conveyor for moving the center of gravity of the robot and raising the caster above the obstacle;
    unfixing the main body and the drive wheels when the caster is raised;
    operating the weight conveyor for returning the center of gravity of the robot to an original position when the main body and the drive wheels are unfixed; and
    rotating the drive wheels and moving the robot when the center of gravity of the robot is returned to the original position.

13. The method of claim 12, wherein the step of fixing the main body and the drive wheels excludes a rotating angle of the drive wheels with respect to the main body.

14. The method of claim 12, wherein the steps of operating the weight conveyor comprise:
    operating a conveyor motor; and
    using a conveyor pulley and a conveyor belt driven by the operating of the conveyor motor, and conveying a conveyed weight.

* * * * *